J. BECKMAN.
SAW SHARPENING MACHINE.
APPLICATION FILED JUNE 29, 1915.

1,173,920.

Patented Feb. 29, 1916.
3 SHEETS—SHEET 1.

Inventor
John Beckman
Witnesses
By Victor J. Evans
Attorney

J. BECKMAN.
SAW SHARPENING MACHINE.
APPLICATION FILED JUNE 29, 1915.
1,173,920.
Patented Feb. 29, 1916.
3 SHEETS—SHEET 2.
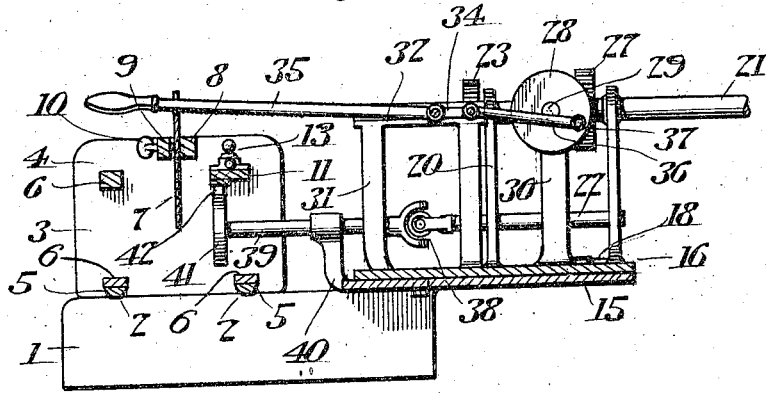
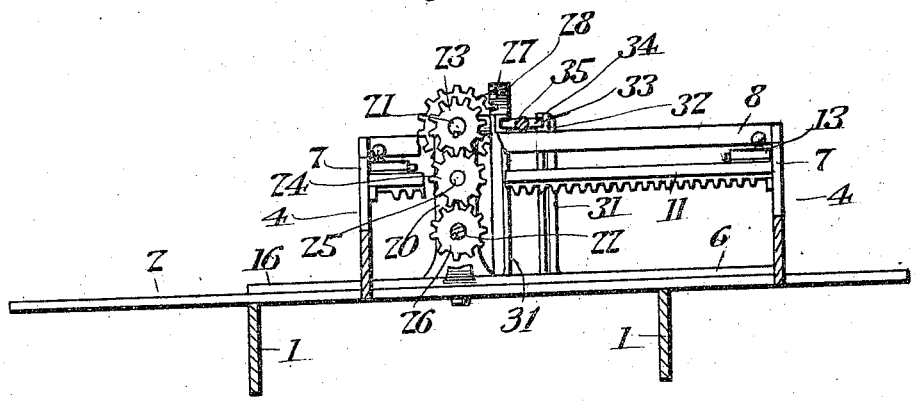
Witnesses
Inventor
John Beckman
By Victor J. Evans
Attorney J. BECKMAN.
SAW SHARPENING MACHINE.
APPLICATION FILED JUNE 29, 1915.
1,173,920.
Patented Feb. 29, 1916.
3 SHEETS—SHEET 3.
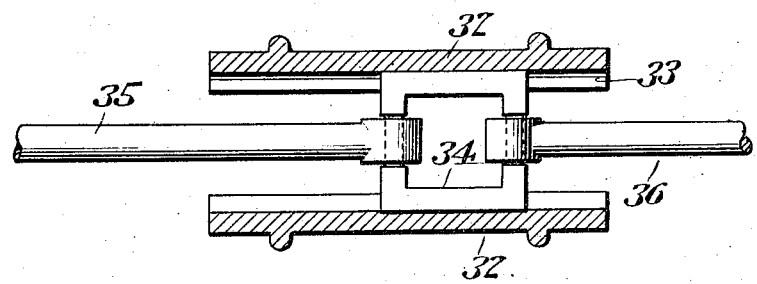
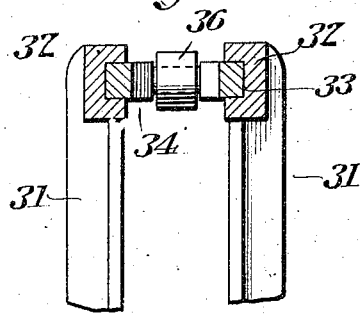
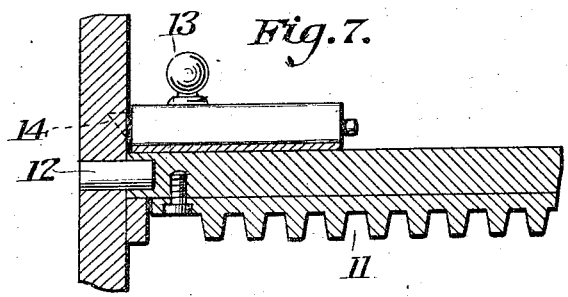
Inventor
John Beckman
Witnesses
By Victor J. Evans
Attorney

UNITED STATES PATENT OFFICE.

JOHN BECKMAN, OF YOSEMITE, CALIFORNIA.

SAW-SHARPENING MACHINE.

1,173,920.  Specification of Letters Patent.  Patented Feb. 29, 1916.

Application filed June 29, 1915. Serial No. 37,013.

*To all whom it may concern:*

Be it known that I, JOHN BECKMAN, a citizen of the United States, residing at Yosemite, in the county of Mariposa and State of California, have invented new and useful Improvements in Saw-Sharpening Machines, of which the following is a specification.

This invention relates to improvements in saw sharpening machines and has particular application to a machine of the reciprocating file type.

In carrying out the present invention, it is my purpose to improve and simplify the general construction of saw sharpening machines of the reciprocating file type and to provide a machine wherein the carriage carrying the saw will be automatically advanced in a step by step manner during the sharpening operation and to insure the sharpening of all the teeth of the saw and wherein the file will be reciprocated over each tooth of the saw a certain number of times previous to the movement of the carriage, thereby enabling the saw to be effectively sharpened.

It is also my purpose to provide a saw sharpening machine of the class described wherein the filing mechanism may be turned to any desired angle to correspond with the angle of the saw teeth so as to insure the proper sharpening of the teeth, and wherein the component parts will be so arranged and correlated as to reduce the possibility of derangement to a minimum.

With the above and other objects in view, the invention consists in the construction, combination and arrangement of parts hereinafter set forth in and falling within the scope of the claims.

Figure 1:
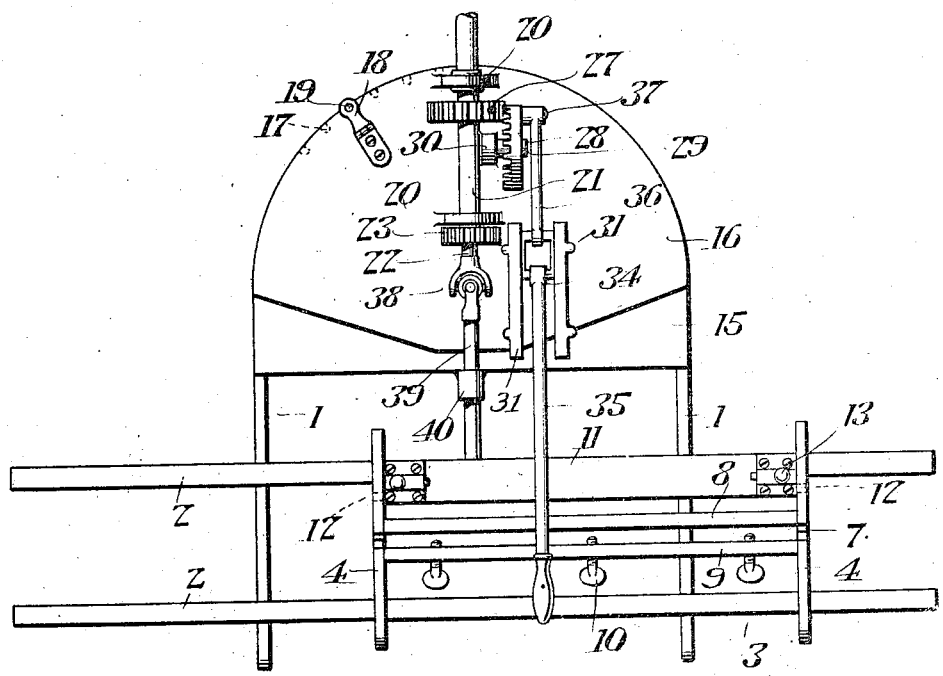
Figure 2:
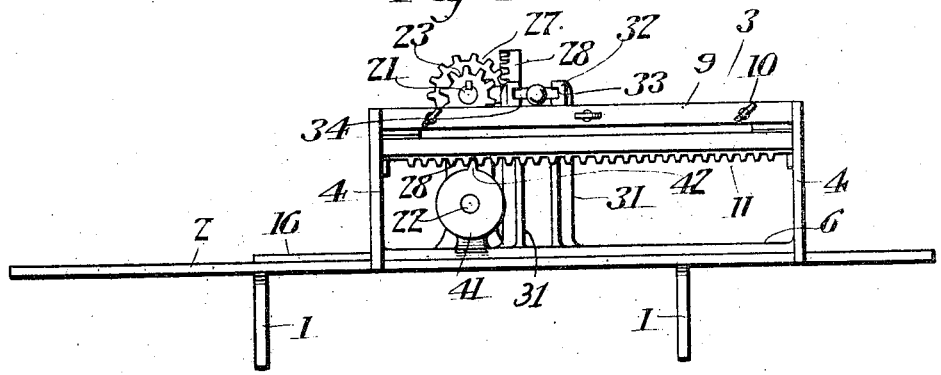

In the accompanying drawings: Figure 1 is a top plan view of a saw sharpening machine constructed in accordance with the present invention. Fig. 2 is a view in front in parallelism, while 2, 2 indicate guide tracks secured to the upper ends of the legs 1, 1 and spanning the space between such legs and arranged parallel with each other.

3 designates a carriage comprising end plates 4, 4 each having the lower edge thereof formed with grooves 5, 5 spaced apart and alining respectively with the grooves in the bottom of the other plate and these alining grooves receive the tracks 2, 2 respectively so that the carriage may be held upon the tracks and moved longitudinally therealong. The end plates 4, 4 are held in spaced parallel relation and in carriage formation by means of tie rods 6 appropriately arranged, while formed in the end plates 4, 4 respectively are vertical saw receiving slots 7 alining with each other. Disposed between the plates 4, 4 is a saw clamp embodying a strip 8 having the ends thereof secured to the inner surfaces of the respective plates 4, 4 upon one side of the slots 7, and the strip 9 having the ends thereof secured to the inner surfaces of such end plates and disposed at the opposite side of the slots 7 and spaced apart from the strip 8 in parallelism therewith. These strips 8 and 9 and the slots 7 coöperate to receive the saw to be sharpened as illustrated in Fig. 3 of the drawings, and when the saw is disposed in the clamp the toothed edge thereof projects upwardly above the strips 8 and 9. In the present instance the strip 9 is equipped with set screws 10 whereby the saw may be fastened within the clamp and held therein against movement.

11 designates a rack bar disposed between the end plates 4, 4 adjacent to one side of the carriage and the ends of the rack bar 11 are formed with axially alining sockets that receive similarly arranged pins 12 carried by the inner faces of the respective end plates 4, 4. The lower surface of the rack bar 11 is equipped with the teeth while the therefrom is a platform 15 disposed in advance of the front side of the carriage and pivoted centrally upon the platform 15 is a turn table 16 capable of turning movement upon the platform. The front edges of the platform and turn table are curved and formed in the edge of the platform are slots 17, while pivoted upon the turn table is a holding arm 18 equipped with a depending pin 19 adapted to pass through an opening in the turn table to engage in an alined slot 17 to hold the turn table against turning movement upon the platform. Uprising from the turn table 16 and spaced apart transversely of such table are standards 20 and journaled in the standards 20 adjacent to the upper ends thereof is a drive shaft 21, while journaled in the standards adjacent to the lower ends thereof and disposed in parallelism with the drive shaft 21 is a power transmission shaft 22. One end of the drive shaft 21 is equipped with a crank handle or connected up with a driving motor, while keyed upon the remaining end of the drive shaft is a spur pinion 23 meshing with a similar pinion 24 rotatably mounted upon a stub shaft 25 carried by the inner standard 20. The pinion 24 meshes with a pinion 26 keyed upon the power transmission shaft 22 so that in the rotation of the drive shaft motion will be transmitted through the pinions 23, 24 and 26 to the shaft 22, thereby rotating the latter. Also keyed upon the drive shaft 21 between the standards is a spur pinion 27 meshing with a crown gear 28 journaled upon a stub shaft 29 carried by the upper end of a standard 30 mounted upon the turn table between the standards 21.

31, 31 designate uprights fastened to the turn table at one side of the power transmission shaft 22 and adjacent to the crown gear 28 and secured to the upper ends of the uprights 31, 31 are guides 32, 32 respectively spaced apart in parallelism and having the confronting faces thereof formed with longitudinal grooves 33. Mounted within the grooves 33 and capable of rectilinear motion therein is a head 34. In the present instance, this head is in the form of a rectangular frame and pivtotally connected with one end bar of the frame forming the head 34 is a file 35, while pivotally connected with the remaining end bar of the head forming the frame is one extremity of a pitman 36 and the remaining end of the pitman 36 is connected with a crank pin 37 secured to the outer surface of the crown gear 28 adjacent to the periphery of such gear. The rear end of the transmission shaft 22, that is the end adjacent to the rack bar 11, is connected through the medium of a universal joint 38 with a shaft section 39 journaled in a bearing 40 carried by the rear edge of the turn table and the universal joint 38 is disposed in line with the pivot of the turn table 16. Keyed upon the shaft section 39 is a disk 41 having the periphery thereof provided with a radial pin 42 adapted to engage the rack bar 11 to advance the carriage along the guide tracks.

In practice, the rack bar is disposed in normal position and held in such position by the latches and the turn table rotated upon the platform to dispose the file 35 at an angle corresponding to the angle of the teeth of the saw in the clamp and the turn table locked in adjusted position. Power is now imparted to the drive shaft 21 and in the rotation of the drive shaft 21 the crown gear is revolved and reciprocates the head 34 in the grooves 33 of the guides 32, thereby imparting rectilinear motion to the file so as to move the latter over the adjacent tooth of the saw to sharpen such tooth. In the rotation of the drive shaft 21 motion is imparted to the transmission shaft 22 and the latter revolves the shaft section 39 and after the file has made a certain number of movements, determined by the ratio of the gears between the drive shaft and the power transmission shaft, the pin 42 carried by the disk 41 engages the adjacent tooth of the rack bar 11 and moves the carriage along the guide tracks a distance equal to the distance of one saw tooth and in this movement of the carriage the file rides out of the previously sharpened tooth and into engagement with the next tooth, the file swinging about its pivotal connection with the head to disengage and engage the adjacent teeth of the saw in the clamp.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In a saw sharpening machine, supporting legs spaced apart in parallelism, guide tracks secured to the upper ends of said legs and spanning the space between the same and disposed parallel with each other, a carriage embodying end plates each having the lower edge thereof formed with grooves spaced apart and alining respectively with the grooves in the bottom edges of the other plate to receive said tracks, tie rods holding said side plates in proper relative positions, a saw clamp on said carriage, and filing mechanism for sharpening the teeth of the saw in said clamp.

2. In a saw sharpening machine, supporting legs spaced apart in parallelism, guide tracks secured to the upper ends of said legs and spanning the space between the same and disposed parallel with each other, a carriage embodying end plates each having the lower edge thereof formed with grooves spaced apart and alining respectively with the grooves in the bottom edge of the other plate to receive said tracks, tie rods holding said side plates in proper relative positions, a saw clamp on said carriage, a platform carried by said legs, a turn table mounted upon said platform, and saw filing mechanism carried by said turn table to sharpen the teeth of the saw in said clamp.

In testimony whereof I affix my signature in presence of two witnesses.

JOHN BECKMAN.

Witnesses:
ARTHUR YOUNG,
JAS. DE PAULI.